Figure 1:
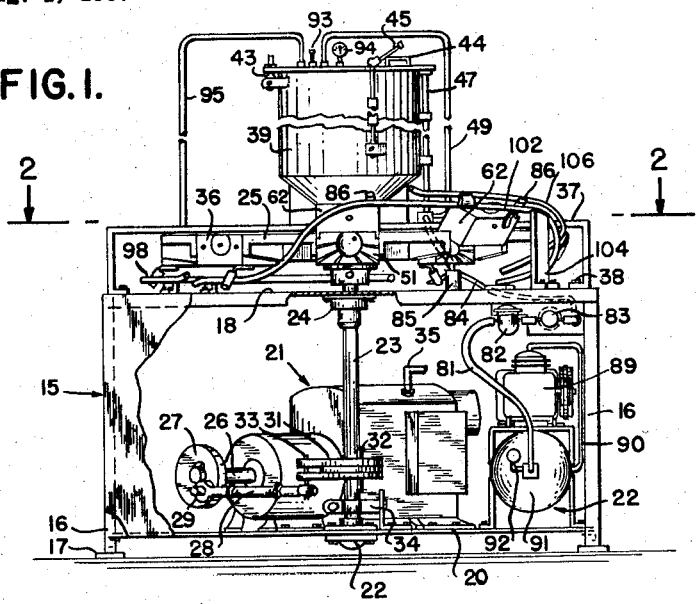

July 7, 1959     A. A. MONGIELLO     2,893,121

CHEESE BALL WEIGHING AND SHAPING MACHINE

Filed Aug. 1, 1957     3 Sheets-Sheet 1

INVENTOR.
Angelo A. Mongiello

BY *L. S. Saulsbury*

ATTORNEY

July 7, 1959  A. A. MONGIELLO  2,893,121
CHEESE BALL WEIGHING AND SHAPING MACHINE
Filed Aug. 1, 1957  3 Sheets-Sheet 2

INVENTOR.
Angelo A. Mongiello
BY
*L. S. Saulsbury*
ATTORNEY

July 7, 1959  A. A. MONGIELLO  2,893,121
CHEESE BALL WEIGHING AND SHAPING MACHINE
Filed Aug. 1, 1957  3 Sheets-Sheet 3

INVENTOR.
Angelo A. Mongiello
BY
L. S. Saulsbury
ATTORNEY

United States Patent Office 2,893,121
Patented July 7, 1959

2,893,121

CHEESE BALL WEIGHING AND SHAPING MACHINE

Angelo A. Mongiello, Brooklyn, N.Y.

Application August 1, 1957, Serial No. 675,729

12 Claims. (Cl. 31—46)

This invention relates to a machine for weighing and shaping cheese balls.

It is the principal object of the present machine to provide a machine for weighing and shaping cheese balls from mozzarella cheese which is automatic and which allows time for the cheese ball once it has been shaped in the mold to become sufficiently laminated and hardened, before it is discharged from the mold, so as to maintain its shape when discharged and done while the molds are advanced between the filling and discharging positions.

It is another object of the invention to provide in an automatic machine for weighing and shaping mozzarella cheese balls, that will cut off the cheese from the mass of cheese in the hopper, laminate, close and hold the cut off or severed tip on the ball for a sufficient time for it to adhere with the bulk of the cheese ball and so that the ball will remain laminated and the cheese ball fully closed and perfectly shaped, this being effected while the severed tip remaining in the opening of the mold is run against the underface of the laminating plate during the movement of the mold from the filling position toward the discharging position whereby the laminations of the cheese are positively maintained upon the cheese ball while the cheese is starting to set and harden.

It is a still further object of the invention to provide in an automatic mozzarella cheese ball weighing and shaping machine split molds in which one mold half is hinged upon the other in an offset manner and which is so shaped that upon the movable mold half being lifted from the fixed mold half the movable mold half itself will bear against the top of the cheese ball and forcibly eject the cheese ball from the recess of the fixed mold half and into a cold water collecting vessel.

It is a further object of the invention to provide in an automatic cheese ball for weighing and shaping machine molds which may be adjusted so that more than one size cheese ball can be made by the machine during the same run of the cheese mass and while using the same air pressure.

Still further objects of the invention are to provide an automatic machine for weighing and shaping cheese balls and other similar mass material, having the above objects in mind, which is simple in construction, has a minimum number of parts, relatively inexpensive to manufacture, easy to maintain, has a minimum number of moving parts, easy to control, takes up little space, and efficient in operation.

Figure 2:
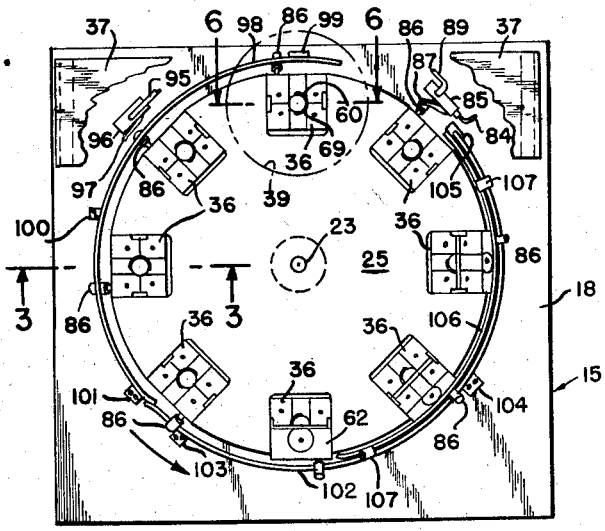
Figure 3:
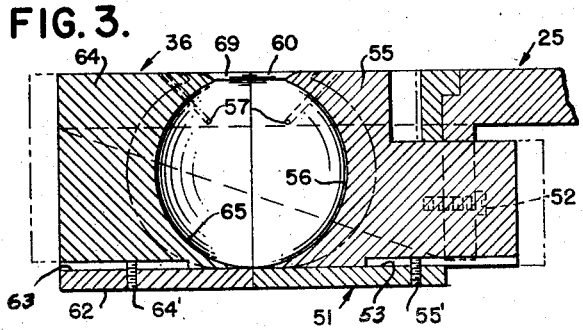
Figure 4:
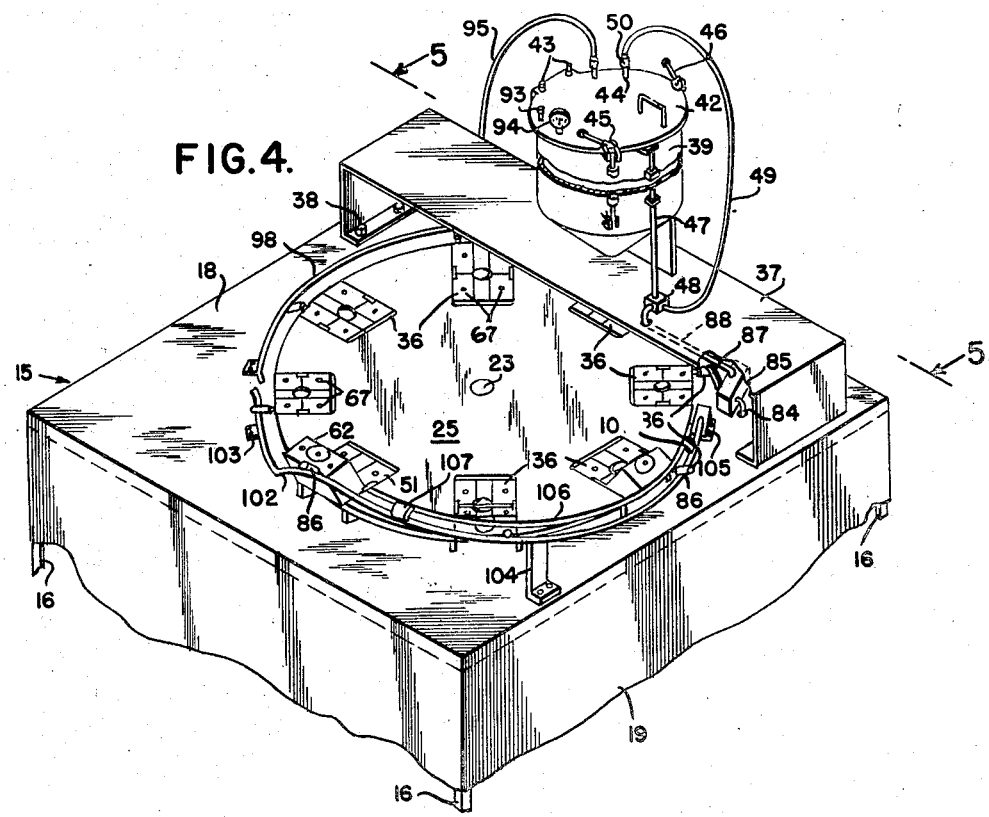
Figure 6:
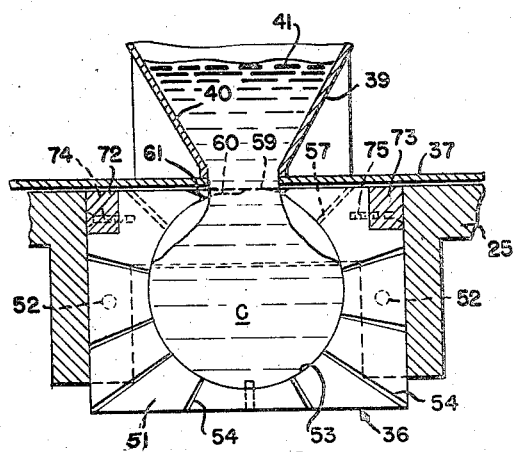
Figure 7:
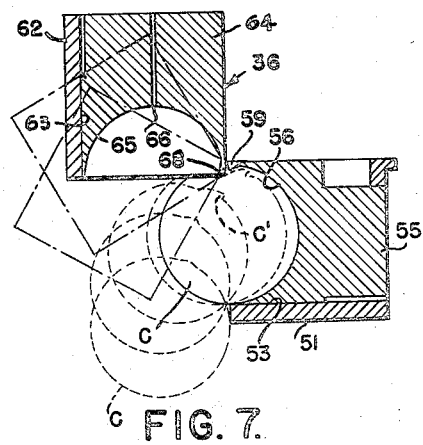
Figure 8:
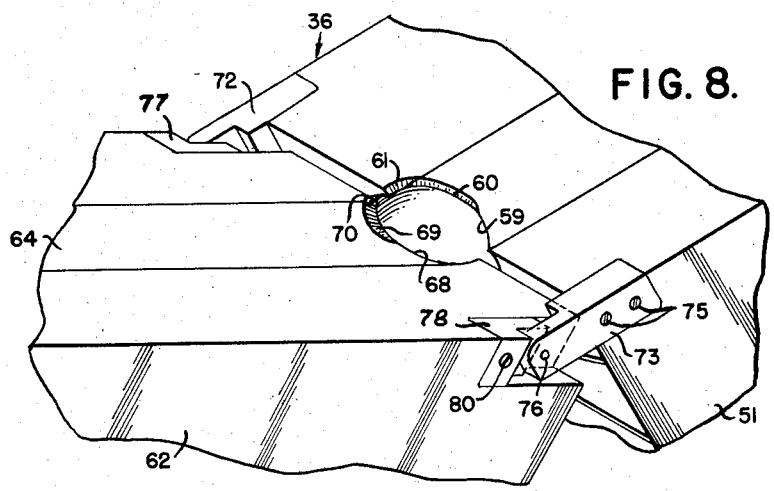
Figure 5:
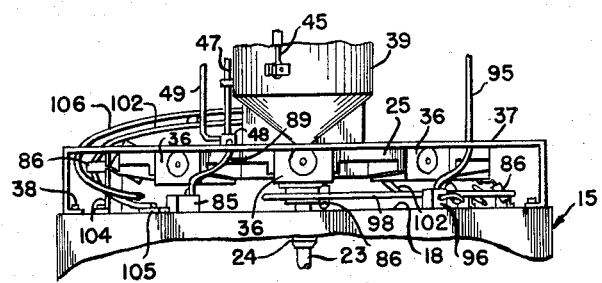
Figure 9:
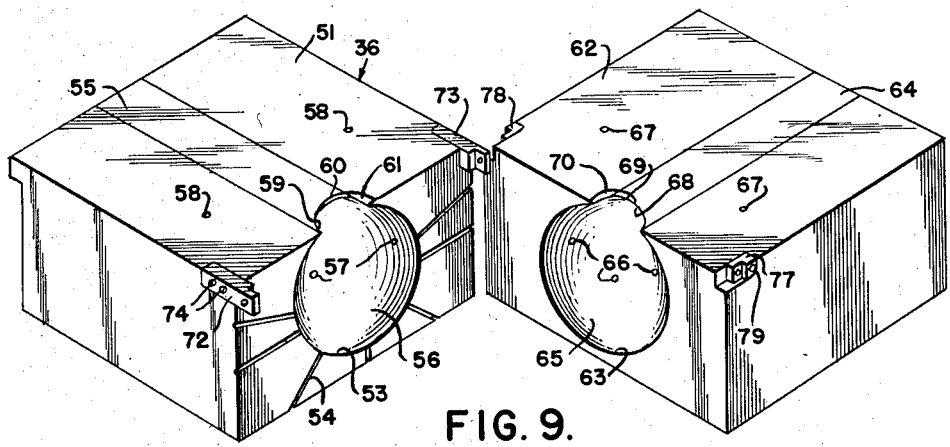

For a better understanding of the invention, reference may be had to the following detailed description taken in connection with the accompanying drawing, in which Figure 1 is an elevational view of the cheese ball weighing and shaping machine embodying the features of the present invention with side portions of the table broken away to show the equipment thereunder, Fig. 2 is a transverse sectional view taken on line 2—2 of Fig. 1, Fig. 3 is an enlarged fragmentary vertical sectional view taken through the split mold on line 3—3 of Fig. 2, Fig. 4 is a fragmentary top rear perspective view of the machine, Fig. 5 is a fragmentary front elevational view looking generally in the direction of the arrows 5—5 of Fig. 4, Fig. 6 is an enlarged vertical sectional view taken through the mold and cheese hopper looking upon the recessed face of the fixed mold and as viewed on line 6—6 of Fig. 2, Fig. 7 is a vertical sectional view of the mold with the outer mold half hinged upwardly from the lower mold half, an illustration being made as to the manner in which the upper mold half positively ejects the cheese ball from the recess of the fixed mold half, Fig. 8 is an enlarged fragmentary view of the mold halves with the hinged half part partially lifted from the fixed half, and Fig. 9 is a perspective view of the mold halves angled from one another to look upon the working faces thereof.

Referring now to the figures, 15 generally represents a square table having four legs 16 with feet 17 thereon, a table top surface 18 and a side closure casing 19. Near the bottom of the table but spaced upwardly from the floor is a platform 20 that supports a variable speed power unit 21 and a compressor unit 22. Supported in the center of the platform 20 is a bottom thrust bearing 22 for a rotatable shaft 23 that passes upwardly through a bearing 24 on the underside of the top surface 18 and through the table top to support and drive a rotating mold carrier 25.

The power unit 21 has a rotating output shaft 26 with a crank wheel 27 thereon to which an adjustable crank rod 28 is pivotally connected by a crank pin 29. A ratchet feed device 31 is secured to the shaft 23 by a key 32 and the adjustable crank rod 28 is connected to this ratchet device by a pivot pin 33. As the ratchet feed device is worked by the crank rod 28, the carrier 25 is advanced one station at a time. A brake device 34 is applied to the vertical shaft 23 to prevent the return movement of the carriage as the ratchet feed device is retracted for the next stroke. The carriage can be centered for proper movement by adjusting the length of the crank rod. An adjusting handle 35 on the motor 21 controls the speed of rotational movement of the carriage 25.

On the periphery of the carriage are split molds 36 into which the cheese is forced and shaped. There are eight of these molds equally angularly spaced from one another. The top surfaces of these molds are flush with the top surface of the carrier 25 and swing with the carrier under a transversely-extending laminating and hopper support plate 37 secured by bolts 38 to the top surface 18 of the table 15. A wiping action is had with the under surface of the support plate 37 to laminate the cheese tip into the ball mass. A hopper 39 is supported by the member 37 and through an opening 40 in the hopper 39 and member 37 cheese material 41 is forced and delivered to the mold 36. The hopper 39 has a cover 42 hinged at 43 to one side of the hopper. By means of a handle 44 the cover can be lifted for the purpose of loading the hopper with warm cheese material 41, or for being cleaned. The cover 31 is tightly locked to the hopper by latch devices 45 and 46. At the same time the cover is brought down, an operating rod 47 on the side thereof is depressed to open an air saving valve 48. If the cover is lifted, the valve 48 is automatically closed and air is prevented from being exhausted from valve 48 through a hose 49 and fitting 50, and wasted.

The mold 36 has a fixed half 51 that is secured to the carrier 25 by screws 52. This mold half 51 has a cylindrical opening 53 and air vents 54 leading outwardly therefrom over the front face thereof. In this cylindrical opening 53, is an adjustable part 55 having a semi-spherical recess 56 from which openings 57 lead to communicate with openings 58 in the fixed half 51. The top surface of the adjustable part 55 has a recess 56, a half circular cutaway 59 through which the cheese is extruded. This cutaway is sharpened to provide a depressed cutting edge 60 and continuous therewith is a sharpened or depressed cutting lip portion 61 on the main part of half 51. When larger cheese balls are desired the adjustable part 55 is rearwardly adjusted upon the main part in the opening 53 and is held in its adjusted position by a screw 55'. In this way the weight of the cheese ball can be controlled.

A movable mold half 62 has a cylindrical opening 63 in which there is an adjustable part 64. The adjustable part 64 has a semi-spherical recess 65 that mates with recess 56 and has vent openings 66 that lead to openings 67 in the main part of half 62. This part 64 is likewise rearwardly adjusted for the larger cheese ball. At the top of the adjustable part 64 above the recess 65 is a circular cutout 68 that is beveled at 69 to provide a depressed cutting edge that is a continuation of a depressed cutting lip portion 70 on the main part 62. The cutting edges 59 and 68 when the halves are held together provide an opening through which the cheese is discharged and the recesses 56 and 65 provide the mold shape.

The mold half 51 has on its side edges projecting hinge members 72 and 73 respectively secured by screws 74 and 75 within recesses on the side edges of the mold half 51. These hinge parts 72 and 73 project from the end face of the half 51 and are pivotally connected respectively by pivot pins 76 to respective cooperating hinge parts 77 and 78 respectively secured by screws 79 and 80 to the movable mold half 62.

It will be apparent that with these hinge parts, the movable mold half 61 can be lifted as best illustrated in Figs. 7 and 8 to discharge the cheese ball formed within the mold between the recesses 56 and 65. Since the mold half 62 is hingedly offset from the mold half 51, the lifting of the mold half 62 causes the ends of the circular cutout 68 to depress the top of the cheese ball and positively eject the cheese ball out of the recess 56 from the fixed mold half 51.

As the carrier 25 is advanced and the opening of the mold 36 is centered under the opening 40 of the hopper 39, the cheese is forced into the mold by air pressure delivered to the top of the hopper.

The air compressor unit 22 delivers air through a hose 81 to a filter 82, a pressure regulator 83 and hose 84 to an air trip valve 85. The movable mold half 36 has a roller arm projection 86 which engages a lever 87 of the air inlet trip valve 85. As this valve 85 is tripped and the valve 48 is open, when the cover is closed upon the top of the hopper, air passes through hose 88 and hose 49 to the top of the hopper. This air pressure causes the cheese to be forced downwardly through its bottom opening 40 into the mold 36 registered thereunder, the roller on the succeeding mold having been used to trip the air inlet valve 85.

The air compressor unit 22 has a pump 89, a hose 90 that delivers air to a tank 91 that has a shut off valve 92 from which hose 81 extends. The cover has an air safety valve 93 and a pressure gauge 94.

An exhaust hose 95 leads to an exhaust trip valve 96 having a trip lever 97 that will be engaged by the roller 86 of the preceding mold as soon as the next movement of the carrier 25 is effected and the mold starts to leave the opening 40 of the hopper. While the mold 36 is aligned with the hopper 39 it is being filled and is held in the closed position by the roller 86 engaging with the under side of an arcuate guide member 98 supported upon the table surface 18 by upstanding brackets 99, 100 and 101. The mold 36 is thus held closed thereby throughout the next several successive movements of the carrier 25. When the mold 36 leaves the guide 98, the roller 86 engages with the top of an arcuate lifting cam guide member 102 which hinges upwardly mold half 62 at a discharge station immediately in rear of the filling station and a turn one hundred and eighty degrees therefrom. As above stated, the ends of the circular cut out 59 in the mold half 62 depress the top of the cheese ball and positively eject the cheese ball out of the stationary mold. This cheese ball is preferably dropped into cold water to further cool and to harden the cheese ball so that it will thereafter retain its shape.

The arcuate guide 102 is supported on the table surface by upstanding brackets 103, 104 and 105. In order to limit the upward hinging movement of the movable mold half 62 a top guard rail 106 is secured by connections 107 and 108 to the rail 102 and overlies the same. The rollers 86 project outwardly between the rails 102 and 106. As the roll 86 completes its movement over the rail 102 the movable mold half 62 is lowered and closed upon the fixed half 51 so that the roller 86 can engage with the trip lever 87.

The depressed cutting portions 60, 61 and 69, 70 of the mold half parts are joined together and the cheese as it is extruded in the mold is severed by a cutting action of these portions gathering the cheese and finally severing it. The severed portion of the cheese or cut tip C is dragged against the underface of the laminating and hopper support plate 37 to cause the tip C to be held against the cheese ball body C sufficiently to adhere to the body mass and to prevent the separation therefrom whereby a substantially smooth surface of the cheese is afforded over the cheese ball mass at the severed location thereof.

Cheese balls of the same weight will be delivered when the molds are adjusted to the same size. However, it is possible that with regulating the air pressure to the maximum size cheese ball of the different molds cheese balls of different size and weight can be automatically obtained as the different molds are filled one after the other. In other words the different molds can be set to different sizes desired. By regulating the air pressure and with the molds set to the same size the weight of the cheese balls will be substantially of the same weight and of uniform shape and size.

While various changes may be made in the detail construction, it shall be understood that such changes shall be within the spirit and scope of the present invention as defined by the appended claims.

What is claimed is:

1. A machine for forming cheese balls and the like comprising a table, a shaft extending upwardly through the table, a rotatable carrier mounted on the shaft, power means connected to the shaft for intermittently turning said shaft and carrier, a series of split molds on said carrier and angularly spaced from each other, said molds having cheese-receiving openings lying flush with the top of the carrier, a hopper adapted to contain cheese under pressure with which the mold openings are automatically registered in succession, means between the hopper and the mold for severing the cheese in the mold from the cheese in the hopper upon the molds being advanced from the hopper opening and a laminating plate overlying the carrier and the molds for laminating and smoothing down the severed part of the cheese in the mold upon the mold being advanced.

2. A machine for forming cheese balls and the like as defined in claim 1, and means on the table for automatically opening and closing said molds to discharge the cheese ball and to prepare the mold to receive further cheese upon the molds being advanced by the carrier.

3. A machine for forming cheese balls and the like as defined in claim 1, said molds including inner and outer mold parts hinged together to permit the outer mold part to be lifted upwardly from the inner mold part, a cam member on said table and extending about the carrier, a cam follower on the outer mold part movable over said cam to lift the mold part at the discharge station for the purpose of discharging the cheese ball.

4. A machine for forming cheese balls and the like as defined in claim 3, and said mold parts having its hinge line lying outwardly offset from the inner half whereby portions of the outer half are engageable with the cheese ball upon the outer half being lifted to forceably eject the cheese ball from the inner half.

5. A machine for forming cheese balls and the like as defined in claim 2, and air pressure means for directing air under pressure to said hopper, said air pressure means including a trip valve and means on each of said molds engageable with the trip valve to automatically apply pressure to the cheese within the mold upon the mold opening being registered with the hopper.

6. A machine for forming cheese balls and the like as defined in claim 5, and said air pressure means further including an air safety valve biased to a closed position, said hopper having a cover adapted to be hermetically sealed thereover, means engageable by the cover to open said safety valve when the cover is secured to the hopper and to release the safty valve as the cover is lifted from the hopper.

7. A machine for forming cheese balls and the like as defined in claim 5, and air release means for the hopper including a normally closed trip valve engageable by the engaging means on said molds as the filled molds are advanced from the hopper whereby the pressure of the cheese is automatically released after each filling of a mold.

8. A machine for forming cheese balls and the like as defined in claim 3, a further cam member mounted on the table and extending from the filling position of the mold to the beginning of the lifting cam, said cam follower of the mold engaging with said further cam member to hold the mold closed while being turned between the filling position and the lifting cam.

9. A machine for forming cheese balls and the like as defined in claim 3, and a closing cam overlying a portion of the lifting cam engageable by the cam follower to positively cause the lifted outer mold half to be closed.

10. A machine for forming cheese balls and the like as defined in claim 2, and said mold comprising halves adapted to be joined with one another, said severing means on the cheese molds including depressed sharpened edges in the mold opening and joined to one another at the trailing side of the mold opening.

11. A machine for forming cheese balls and the like as defined in claim 2, and said molds including outer and inner mold halves and adjustable internal mold parts respectively provided in the mold halves and adjustable to alter the size and weight of the cheese balls formed by the molds.

12. A machine for forming cheese balls and the like as defined in claim 11, said adjustable parts providing the opening of the mold and depressed cutting edges formed in the adjustable part and in the body of the mold and joined to each other to provide the means for severing the cheese in the mold from the cheese in the hopper.

References Cited in the file of this patent

UNITED STATES PATENTS

| | | |
|---|---|---|
| 1,303,128 | Takahashi | May 6, 1919 |
| 2,712,693 | Comparette | July 12, 1955 |
| 2,745,363 | Balton | May 15, 1956 |